US012573057B2

(12) United States Patent
Asayama

(10) Patent No.: US 12,573,057 B2
(45) Date of Patent: Mar. 10, 2026

(54) SKELETON ESTIMATION DEVICE, SKELETON ESTIMATION METHOD, AND GYMNASTICS SCORING SUPPORT SYSTEM

(71) Applicant: FUJITSU LIMITED, Kawasaki (JP)

(72) Inventor: Yoshihisa Asayama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 372 days.

(21) Appl. No.: 18/206,216

(22) Filed: Jun. 6, 2023

(65) Prior Publication Data

US 2023/0316543 A1        Oct. 5, 2023

Related U.S. Application Data

(63) Continuation of application No. PCT/JP2021/000107, filed on Jan. 5, 2021.

(51) Int. Cl.
*G06T 7/246* (2017.01)
*G06T 7/521* (2017.01)

(52) U.S. Cl.
CPC .............. *G06T 7/246* (2017.01); *G06T 7/521* (2017.01); *G06T 2207/10028* (2013.01); *G06T 2207/30196* (2013.01); *G06T 2207/30221* (2013.01)

(58) Field of Classification Search
CPC ..................... G06T 7/246; G06T 7/521; G06T 2207/10028; G06T 2207/30196; G06T 2207/30221; G06T 2207/20081; G06T 2207/20084; G06T 7/251; G06V 10/993; G06V 40/23; A61B 5/107; A61B 5/11
See application file for complete search history.

(56) References Cited

U.S. PATENT DOCUMENTS

| | | | |
|---|---|---|---|
| 11,284,041 B1 * | 3/2022 | Bergamo | ................ G06T 7/251 |
| 2008/0112592 A1 | 5/2008 | Wu et al. | |

(Continued)

FOREIGN PATENT DOCUMENTS

| | | |
|---|---|---|
| JP | 10-171854 A | 6/1998 |
| JP | 2007-333690 A | 12/2007 |

(Continued)

OTHER PUBLICATIONS

International Search Report dated Mar. 23, 2021 for International Application No. PCT/JP2021/000107.

(Continued)

*Primary Examiner* — Jennifer Mehmood
*Assistant Examiner* — Dustin Bilodeau
(74) *Attorney, Agent, or Firm* — STAAS & HALSEY LLP

(57)        ABSTRACT

A skeleton estimation device including: memory; and processor circuitry coupled to the memory, the processor circuitry being configured to perform processing including: acquiring estimation information in which a change in a skeleton in a predetermined period is estimated in units of frames; calculating a feature amount of the change in the skeleton in the predetermined period; calculating an approximate line based on the calculated feature amount; calculating a correlation state between the calculated feature amount and the calculated approximate line; and detecting, as a defective skeleton, the frame portion in which estimation is abnormal in the estimation information in the predetermined period based on the correlation state.

13 Claims, 14 Drawing Sheets

(56)                  References Cited

U.S. PATENT DOCUMENTS

| | | | |
|---|---|---|---|
| 2009/0220124 A1* | 9/2009 | Siegel ..................... | G06T 7/292 |
| | | | 382/103 |
| 2014/0219550 A1* | 8/2014 | Popa ...................... | G06V 20/42 |
| | | | 382/154 |
| 2020/0188736 A1 | 6/2020 | Naito et al. | |
| 2024/0005600 A1* | 1/2024 | Tahara ................... | G06F 3/015 |

FOREIGN PATENT DOCUMENTS

| | | |
|---|---|---|
| JP | 2009-15558 A | 1/2009 |
| WO | 2019/049216 A1 | 3/2019 |

OTHER PUBLICATIONS

H. Tomimori et al., "A Judging Support System for Gymnastics Using 3D Sensing", Journal of the Robotics Society of Japan, vol. 38, No. 4, ISSN 0289-1824, pp. 339-344, May 15, 2020.

Y. Hasegawa et al., *"Pose Estimation for Automatic Scoring in Artistic Gymnastics"*, Lecture proceedings (2) of the 82nd (2020) national conference of Artificial intelligence and Cognitive science, pp. 2-539-2-540, Feb. 20, 2020.

S. Masui et al., "A Judging Support System for Gymnastics Using 3D Sensing and Element Recognition", The Journal of Institute of Electronics, Information and Communication Engineers, vol. 103, No. 1, pp. 5-14, Jan. 1, 2020, ISSN 0913-5693.

Nikkei Trendy, "World-recognized Fujitsu's gymnastics judgment AI, Determine the difference of "only 1 degree" of the joints that divide the game", No. 456, pp. 156-157, Dec. 4, 2019.

H. Endo et al., *"Aiming to develop sports industry by systematizing gymnastics scoring"*, Gis Next, No. 66, pp. 12-15, Jan. 28, 2019.

Y. Hasegawa et al., "Skeleton Estimation for Automatic Scoring in Artistic Gymnastics", Lecture proceedings (2) of the 82nd (2020) national conference of Artificial intelligence and Cognitive science, pp. 2- 539-2-540, Feb. 20, 2020.

H. Endo et al., "Aiming for the development of the sports industry from the systematizing gymnastics scoring", Gis Next, No. 66, pp. 12-15, Jan. 28, 2019

Extended European Search Report dated May 15, 2024 for European Application No. 21917418.2.

* cited by examiner

FIG. 7

SKELETON ESTIMATION DEVICE, SKELETON ESTIMATION METHOD, AND GYMNASTICS SCORING SUPPORT SYSTEM

CROSS-REFERENCE TO RELATED APPLICATION

This application is a continuation application of International Application PCT/JP2021/000107 filed on Jan. 5, 2021 and designated the U.S., the entire contents of which are incorporated herein by reference.

FIELD

The present disclosure relates to a skeleton estimation device, a skeleton estimation method, and a gymnastics scoring support system for estimating a skeleton of a human body that changes.

BACKGROUND

Skeleton recognition of human bodies has been used in a wide range of fields such as gymnastics and medical care. For example, the current method of scoring gymnastics competitions is visually performed by a plurality of scoring persons, but there has been an increasing number of cases where the visual scoring by the scoring persons is difficult due to recent sophistication of techniques. Therefore, it is conceivable that a skeleton estimation device supports the scoring by recognizing skeleton information and an angle of each joint of a gymnast, executed technique information, and the like based on three-dimensional data of the gymnast acquired by a 3D laser sensor, and providing information of a skeleton (for example, a posture) to the scoring persons.

Conventionally, as a technique related to skeleton estimation, for example, there is a technique of generating a silhouette image from each of time-series frame images, evaluating a likelihood of each posture state using the generated silhouette image by posture state prediction, and estimating the posture of an articulated animal. Furthermore, there is a technique of predicting a joint position in an order according to a connectivity constraint between joints of a kinematics model, projecting the predicted position on a two-dimensional image, and evaluating reliability of the projected position, thereby recognizing posture and action of a target person, and using the recognized posture and action for motion capture. Furthermore, there is a technique of generating and modifying an articulated action in computer graphics by using action patterns of joints of human bodies stored in a database when generating a human animation (for example, see Patent Documents 1 to 3 below).

Examples of the related art include: [Patent Document 1] Japanese Laid-open Patent Publication No. 2009-015558; [Patent Document 2] Japanese Laid-open Patent Publication No. 2007-333690; and [Patent Document 3] Japanese Laid-open Patent Publication No. 10-171854.

SUMMARY

According to an aspect of the embodiments, there is provided a skeleton estimation device including: memory; and processor circuitry coupled to the memory, the processor circuitry being configured to perform processing including: acquiring estimation information in which a change in a skeleton in a predetermined period is estimated in units of frames; calculating a feature amount of the change in the skeleton in the predetermined period; calculating an approximate line based on the calculated feature amount; calculating a correlation state between the calculated feature amount and the calculated approximate line; and detecting, as a defective skeleton, the frame portion in which estimation is abnormal in the estimation information in the predetermined period based on the correlation state.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 is a block diagram illustrating a functional example of defective skeleton detection by feature amount;

DESCRIPTION OF EMBODIMENTS

However, the existing techniques detect sudden changes in a skeleton (joint) of a human body in adjacent frames and perform modification for an action of the skeleton, for example, and have not been able to detect a change in the skeleton based on a series of (entire) actions of the human body.

As a specific example, in a twist technique of the gymnastics competition, an action that the body is twisted once in the entire technique is performed. In this case, the existing techniques detect only a sudden skeleton (posture) change between adjacent frames and are not able to detect a change in the skeleton with respect to the action of twisting the body once in the entire technique. In the gymnastics competition, there are cases where the amount of a twist is different or there is no twist in the technique. Therefore, for example, the existing techniques are not able to detect a skeleton as a defective skeleton in a case where a change in the skeleton between adjacent frames is a possible move as an action of the human body but the skeleton different from an actual move is estimated. Here, the existing techniques have not been able to detect the defective skeleton to be modified in the device, in a series of actions performed in a predetermined time, such as a technique of a gymnastics competition.

In one aspect, an object of the present disclosure is to correctly detect a change in a skeleton in a series of actions of a human body.

EMBODIMENTS

Hereinafter, embodiments of a skeleton estimation device, a skeleton estimation method, and a gymnastics scoring support system will be described in detail with reference to the drawings.

Figure 1:
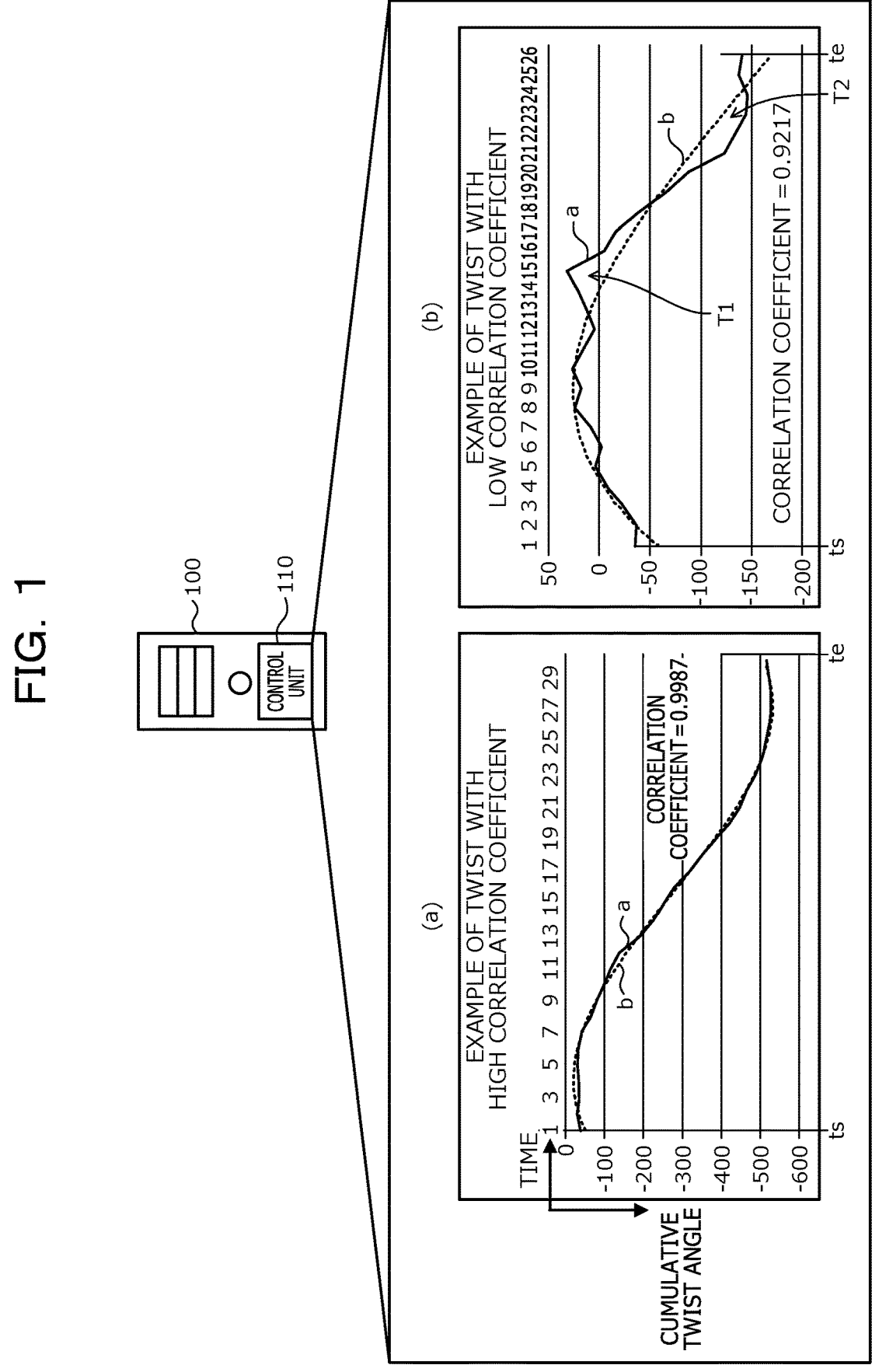
FIG. 1 is an explanatory diagram of a skeleton determination example of a skeleton estimation device according to an embodiment.

FIG. 1 is an explanatory diagram of a skeleton determination example of a skeleton estimation device according to an embodiment. A skeleton estimation device 100 according to the embodiment enables correct detection of a change in a skeleton of a human body in a motion or the like in a predetermined period. For example, the skeleton estimation device 100 estimates the skeleton of a gymnast that changes corresponding to a technique executed by the gymnast during a gymnastics competition. Here, the skeleton estimation device 100 according to the embodiment detects, as a defective skeleton, a portion of the skeleton different from an actual move of the human body (gymnast), of the skeleton estimated in the motion (technique) in the predetermined period.

Information regarding a change in the skeleton in the predetermined period is input to the skeleton estimation device 100. As the information regarding a change in the skeleton, for example, a 3D laser sensor outputs an image (three-dimensional point cloud) including distance information of each of orthogonal X, Y, and Z axes in units of frames for the predetermined period. The skeleton estimation device 100 acquires the output from a plurality of the 3D laser sensors that capture the human body (gymnast) from a plurality of different positions.

A control unit 110 of the skeleton estimation device 100 estimates the skeleton of the human body that changes due to the motion or the like in the predetermined period by executing a skeleton estimation program. The control unit 110 estimates a move (angle) or the like of each joint of the human body from acquired information regarding the change in the skeleton due to the motion or the like of the human body in the predetermined period, and outputs skeleton information as an estimation result. The motion in the predetermined period is a motion assumed in advance, and is, for example, a gymnastics competition. In the gymnastics competition, the gymnast executes a technique over a predetermined period, and the skeleton of the gymnast changes in the predetermined period corresponding to the technique.

Then, the skeleton estimation device 100 according to the embodiment detects, as a defective skeleton, a portion different from an actual move of the human body, in the estimated skeleton information of the move of each joint of the human body by the motion in the predetermined period. Thereby, for example, the skeleton estimation device 100 becomes able to perform skeleton determination again for the portion of the estimation result different from the actual move of the human body.

The control unit 110 detects the defective skeleton by focusing on a feature amount (motion feature amount) of the move of the human body in the predetermined period, and estimating whether the estimated skeleton is likely based on a relationship between the feature amount and a motion feature amount to be expected. The motion feature amount to be expected is, for example, a feature amount corresponding to the technique performed over the predetermined period in the gymnastics competition. Thereby, the estimation result of the skeleton corresponding to performance of the technique by the gymnast in the gymnastics competition can be presented to a scoring person. Furthermore, it becomes possible to perform skeleton determination again for the defective skeleton detected inside the skeleton estimation device 100. Thereby, it becomes possible to present the skeleton estimation result corresponding to the technique of the gymnast to the scoring person of a target competition.

A processing outline of the control unit 110 will be described using an example of a gymnastics competition.

Three-dimensional skeleton information of a gymnast is acquired from the 3D laser sensor or the like.

(2) The feature amount of each frame during a predetermined period (for example, start is to end to of a technique) is calculated.

(3) A likelihood for the motion feature amount of the entire technique in the predetermined period is calculated. For example, the method of calculating the likelihood may be divided into three cases of Case 1 to Case 3 by magnitude of the motion feature amount of the entire technique.

Case 1: For example, in a case where the motion feature amount is less than a preset range, the likelihood is calculated from a maximum value and a minimum value of the feature amount of each frame.

Case 2: In a case where the motion feature amount is within the preset range, an approximate line by a multidimensional function is calculated in a plurality of preset divided sections. Then, the likelihood is calculated from a maximum correlation coefficient among correlation coefficients between the approximate line and the motion feature amount calculated for each divided section.

Case 3: In a case where the motion feature amount exceeds the preset range, an approximate line by a multidimensional function is calculated from the feature amount from the start is to the end to of the technique.

In Cases 2 and 3, the likelihood is calculated from the correlation coefficient between the calculated approximate line and the motion feature amount.

(4) In a case where the likelihood is smaller than a preset threshold, a frame with a maximum difference between the approximate line and the motion feature amount is calculated. Thereby, it is possible to detect the frame (frame with a maximum error) of the portion of the defective skeleton in the estimated skeleton information.

(5) Furthermore, it is possible to perform the skeleton determination again for the frame of the portion of the defective skeleton based on the maximum error frame.

Examples of the above-described motion feature amount include a "twist amount" and a "salto amount" of the gymnastics competition. Furthermore, examples of the multidimensional function include a linear function (straight line) and a cubic function (cubic curve). It is possible to use a cubic curve for the "twist amount", and use a straight line corresponding to the "salto amount".

FIG. 1 illustrates correlation states between the approximate line and the motion feature amount in Case 3 above. The horizontal axis represents a time, and the vertical axis represents a cumulative twist angle. Here, the motion feature amount is a "motion twist amount", and the technique is a single twist or more, for example, a cumulative twist angle of a second flight phase of vault is illustrated.

The control unit 110 calculates an approximate cubic curve b (the dotted line in the figure) suitable for detection of a twist from a cumulative twist angle a (the solid line in the figure) in the predetermined period, that is, from the start ts to the end te of the technique. Next, the control unit 110 calculates a correlation coefficient between the cumulative twist angle and the approximate cubic curve.

Next, the control unit 110 calculates the likelihood from the correlation coefficient using an exponential function of a preset parameter. Then, the control unit 110 detects the presence or absence of the defective skeleton based on the degree of similarity (correlation coefficient) between the cumulative twist angle a and the approximate cubic curve b. In a case where the skeleton is correct, the cumulative twist angle a and the approximate cubic curve b are similar as an example (a) illustrated in FIG. 1, and the correlation coefficient is high. Thereby, the control unit 110 determines that the skeleton information estimated in the predetermined period (from the start ts to the end te of the technique) is correct.

On the other hand, in a case where the skeleton is incorrect, there is a difference between the cumulative twist angle a and the approximate cubic curve b as an example (b) illustrated in FIG. 1, and the correlation coefficient is low. Thereby, the control unit 110 determines that there is an incorrect portion in the skeleton information estimated in the predetermined period (from the start ts to the end te of the technique). In this case, for example, the control unit 110 can perform the skeleton determination again for periods T1 and T2 in which there is a difference between the cumulative twist angle a and the approximate cubic curve b and the correlation coefficient is low.

As described above, according to the embodiment, focusing on the move of the human body in the predetermined period, for example, the motion feature amount as the action of the entire technique of the gymnastics competition, and whether the estimated skeleton is likely is estimated based on the relationship between the motion feature amount and the motion feature amount to be expected. Thereby, it becomes possible to detect the presence or absence of the defective skeleton for the skeleton estimated in the predetermined period.

Furthermore, it becomes possible to perform the skeleton determination again for the portion of the detected defective skeleton, and it becomes possible to improve accuracy of the estimated skeleton over the entire predetermined period. For example, it becomes possible to improve the accuracy of the estimation result of the skeleton corresponding to the technique of the gymnast and present the estimation result to the scoring person of the target competition.

Figure 2:
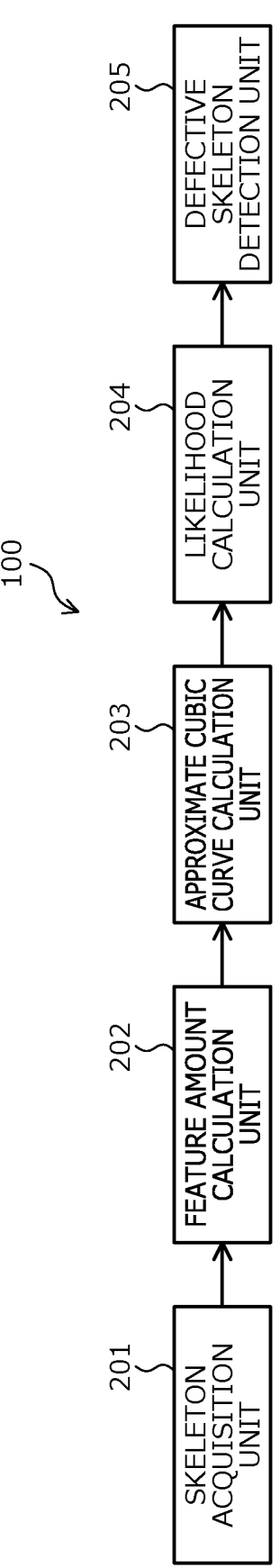
FIG. 2 is a block diagram illustrating a functional example of the skeleton estimation device.

FIG. 2 is a block diagram illustrating a functional example of the skeleton estimation device. FIG. 2 illustrates a main function in the embodiment, that is, a function corresponding to the skeleton estimation of Case 3 above in which the motion feature amount is the "motion twist amount", and the technique is the single twist or more, for example, the cumulative twist angle of the second flight phase of vault.

The skeleton estimation device 100 includes a skeleton acquisition unit 201, a feature amount calculation unit 202, an approximate cubic curve calculation unit 203, a likelihood calculation unit 204, and a defective skeleton detection unit 205. The skeleton acquisition unit 201 acquires the three-dimensional skeleton information of the gymnast from the 3D laser sensor or the like. The three-dimensional skeleton information is, for example, a plurality of frames of a depth image including distance information of each of the X, Y, and Z axes for a predetermined period, for example, from the start is to the end to of the technique.

The skeleton estimation device 100 performs training-type skeleton recognition for the acquired three-dimensional skeleton information, calculates 3D joint coordinates, and fits the 3D joint coordinates to the human body. A change (technique) in the move of the human body is recognized based on the fitted joint coordinates.

The feature amount calculation unit 202, the approximate cubic curve calculation unit 203, the likelihood calculation unit 204, and the defective skeleton detection unit 205 are configuration units related to the technique recognition. The feature amount calculation unit 202 calculates the feature amount of each frame from the start ts to the end te of the technique. The approximate cubic curve calculation unit 203 calculates the approximate line by the multidimensional function from the feature amount from the start ts to the end te of the technique corresponding to Case 3 where the motion feature amount is equal to or more than the preset range (see FIG. 1).

The likelihood calculation unit 204 calculates the likelihood from the correlation coefficient between the calculated approximate line and the motion feature amount. The defective skeleton detection unit 205 calculates the frame in which the difference between the approximate line and the motion feature amount is the maximum in the case where the likelihood is smaller than the preset threshold. Thereby, the frame of the portion of the defective skeleton is detected in the estimated skeleton information.

Figure 3:
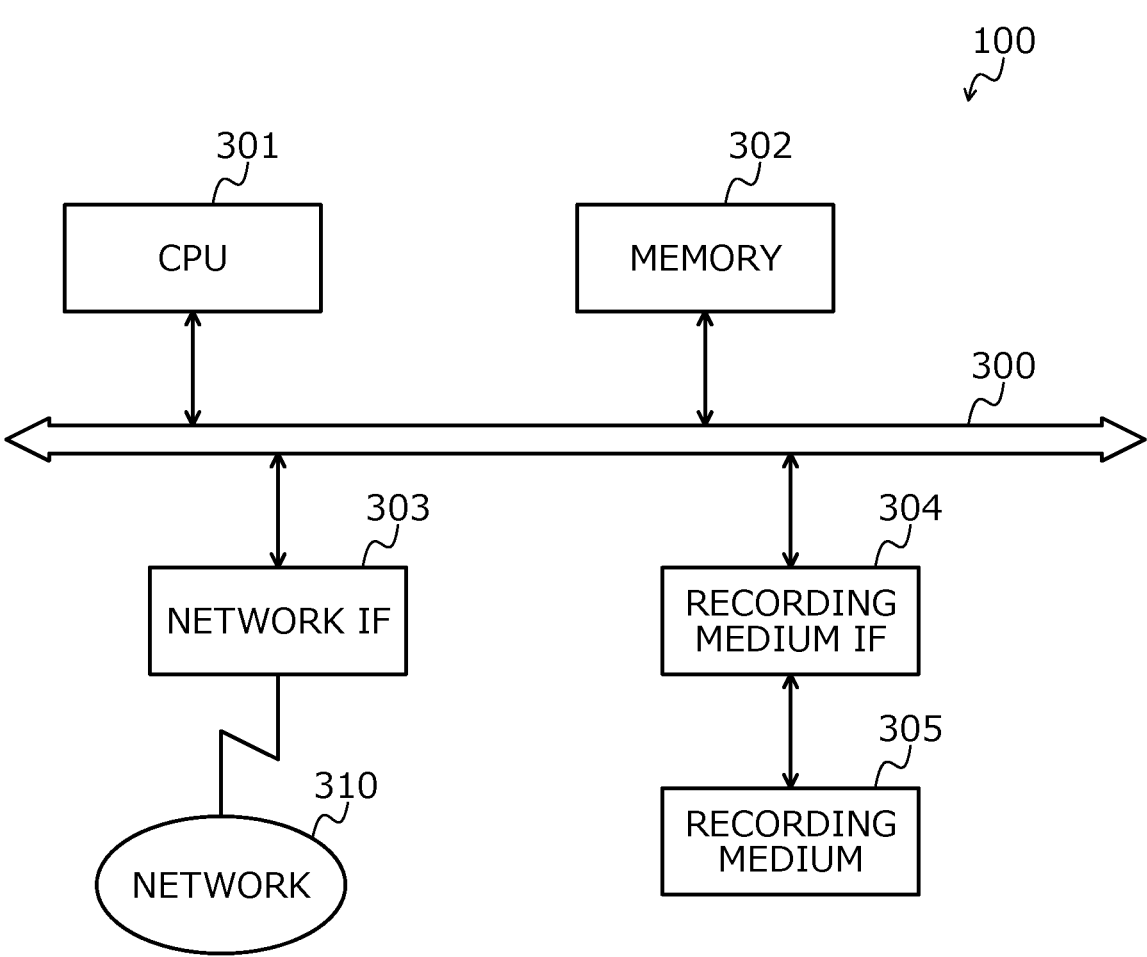
FIG. 3 is a diagram illustrating a hardware configuration example of the skeleton estimation device.

FIG. 3 is a diagram illustrating a hardware configuration example of the skeleton estimation device. The above-described skeleton estimation device 100 can use a computer device configured by hardware illustrated in FIG. 3.

For example, the skeleton estimation device 100 includes a central processing unit (CPU) 301, a memory 302, a network interface (IF) 303, a recording medium IF 304, and a recording medium 305. A bus 300 couples the individual units.

The CPU 301 is an arithmetic processing unit that functions as a control unit that controls the entire processing of the skeleton estimation device 100. The memory 302 includes a nonvolatile memory and a volatile memory. The nonvolatile memory is, for example, a read only memory (ROM) that stores a program of the CPU 301. The volatile memory is, for example, a dynamic random access memory (DRAM), a static random access memory (SRAM), or the like used as a work area of the CPU 301.

The network IF 303 is an interface communicably coupled to a network 310 such as a local area network (LAN), a wide area network (WAN), the Internet, or the like. Through the network IF 303, the skeleton estimation device 100 can be communicably coupled to the 3D laser sensor, a terminal of the scoring person, or the like.

The recording medium IF 304 is an interface for reading and writing information processed by the CPU 301 from and to the recording medium 305. The recording medium 305 is a recording device that assists the memory 302. As the recording medium 305, for example, a hard disk drive (HDD), a solid state drive (SSD), a universal serial bus (USB) flash drive, or the like may be used.

Each function (control unit 110) of the skeleton estimation device 100 illustrated in FIG. 2 can be implemented when the CPU 301 executes a program recorded in the memory 302 or the recording medium 305.

The hardware configuration illustrated in FIG. 3 can also be applied to the terminal (for example, a PC, a smartphone, or the like) of the scoring person. For example, a gymnastics scoring support system in which the skeleton estimation device 100 of the embodiment is coupled to the terminal of the scoring person can be implemented using a general-purpose hardware configuration.

Figure 4:
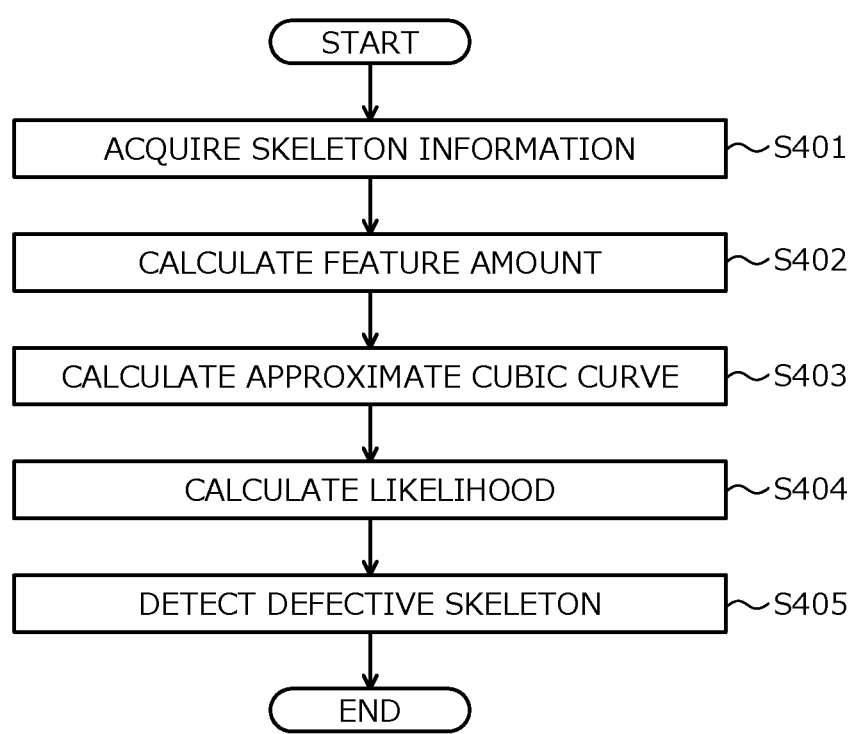
FIG. 4 is a flowchart illustrating a processing example of the skeleton estimation device.

FIG. 4 is a flowchart illustrating a processing example of the skeleton estimation device. FIG. 4 illustrates a processing example corresponding to the configuration of FIG. 2 performed by the control unit 110 of the skeleton estimation device 100.

First, the control unit 110 acquires the three-dimensional skeleton information of the gymnast from the 3D laser sensor or the like (step S401). Next, the control unit 110 calculates the feature amount of each frame from the start ts to the end te of the technique (step S402). Next, the control unit 110 calculates the approximate line (approximate cubic curve, see FIG. 1) by the multidimensional function from the feature amount from the start ts to the end te of the technique (step S403).

Next, the control unit 110 calculates the likelihood from the correlation coefficient between the calculated approximate line and the motion feature amount (step S404). Then, the control unit 110 calculates the frame with the maximum difference between the approximate line and the motion feature amount in the case where the likelihood is smaller than the preset threshold. Thereby, the frame of the portion of the defective skeleton is detected in the estimated skeleton information (step S405).

Thereby, it becomes possible to detect the presence or absence of the defective skeleton for the skeleton estimated in the predetermined period from the start ts to the end te of the technique. Furthermore, it becomes possible to perform the skeleton determination again for the portion of the detected defective skeleton, and it becomes possible to improve accuracy of the estimated skeleton over the entire predetermined period. For example, it becomes possible to improve the accuracy of the estimation result of the skeleton corresponding to the technique of the gymnast and present the estimation result to the terminal of the scoring person of the target competition.

Figures 5A, 5B:
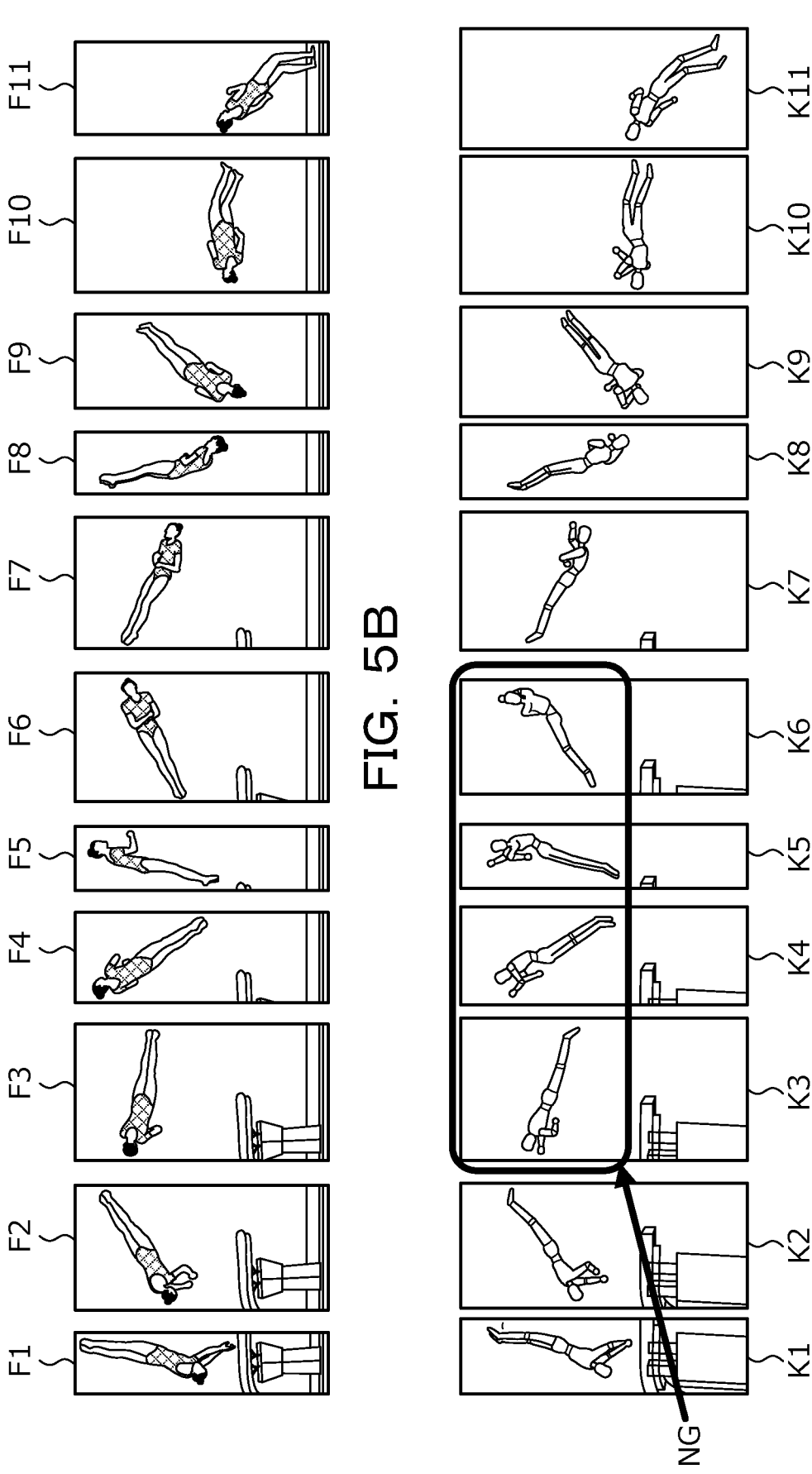
FIG. 5 (i.e., FIGS. 5A and 5B) is diagrams illustrating an example of detecting a defective skeleton for skeleton information estimated in a predetermined period.

FIG. 5 (i.e., FIGS. 5A and 5B) is diagrams illustrating an example of detecting the defective skeleton for the skeleton information estimated in the predetermined period. FIG. 5A illustrates images of a plurality of frames F1 to F 11 in the predetermined period (from the start ts to the end te of the technique) of the gymnast who has performed a twist of the vault in the gymnastics competition. FIG. 5B illustrates CG data K1 to K11 corresponding to the respective frames of FIG. 5A and indicating the skeleton information of the gymnast estimated by the skeleton estimation device 100.

The skeleton estimation device 100 performs the training-type skeleton recognition for the depth image including the distance information of each of the X, Y, and Z axes as the three-dimensional skeleton information of the gymnast acquired from the 3D laser sensor, calculates the 3D joint coordinates, and fits the 3D joint coordinates to a human body model. The CG data K1 to K 11 in FIG. 5B are fitted estimated skeleton information. The skeleton estimation device 100 detects the presence or absence of the defective skeleton with respect to the estimated skeleton information (CG data K1 to K11).

In the actual images illustrated in FIG. 5A, the gymnast performs 1+½ twists to right and left during a single salto (vertical turn) in the twist technique of the vault. In particular, a single twist is performed during F3 to F6. In contrast, in the skeleton information estimated in FIG. 5B, the CG data K3 to K6 are in a state without a twist.

The skeleton estimation device 100 detects the defective skeleton of the CG data K3 to K6 parts different from the actual move by the processing illustrated in FIG. 4 and the like. Thereby, it becomes possible to detect, regarding the estimated skeleton information, partial skeleton information (CG data K3 to K6) different from the actual move although the change in the joint between adjacent frames is not strange as a move of the human body, as a defective skeleton NG.

The skeleton estimation device 100 becomes able to modify the skeleton information of the defective skeleton NG part by performing the skeleton estimation again for the skeleton information (CG data K3 to K6) of the detected defective skeleton NG.

(Application Example to Gymnastics Scoring Support System)

Figure 6:
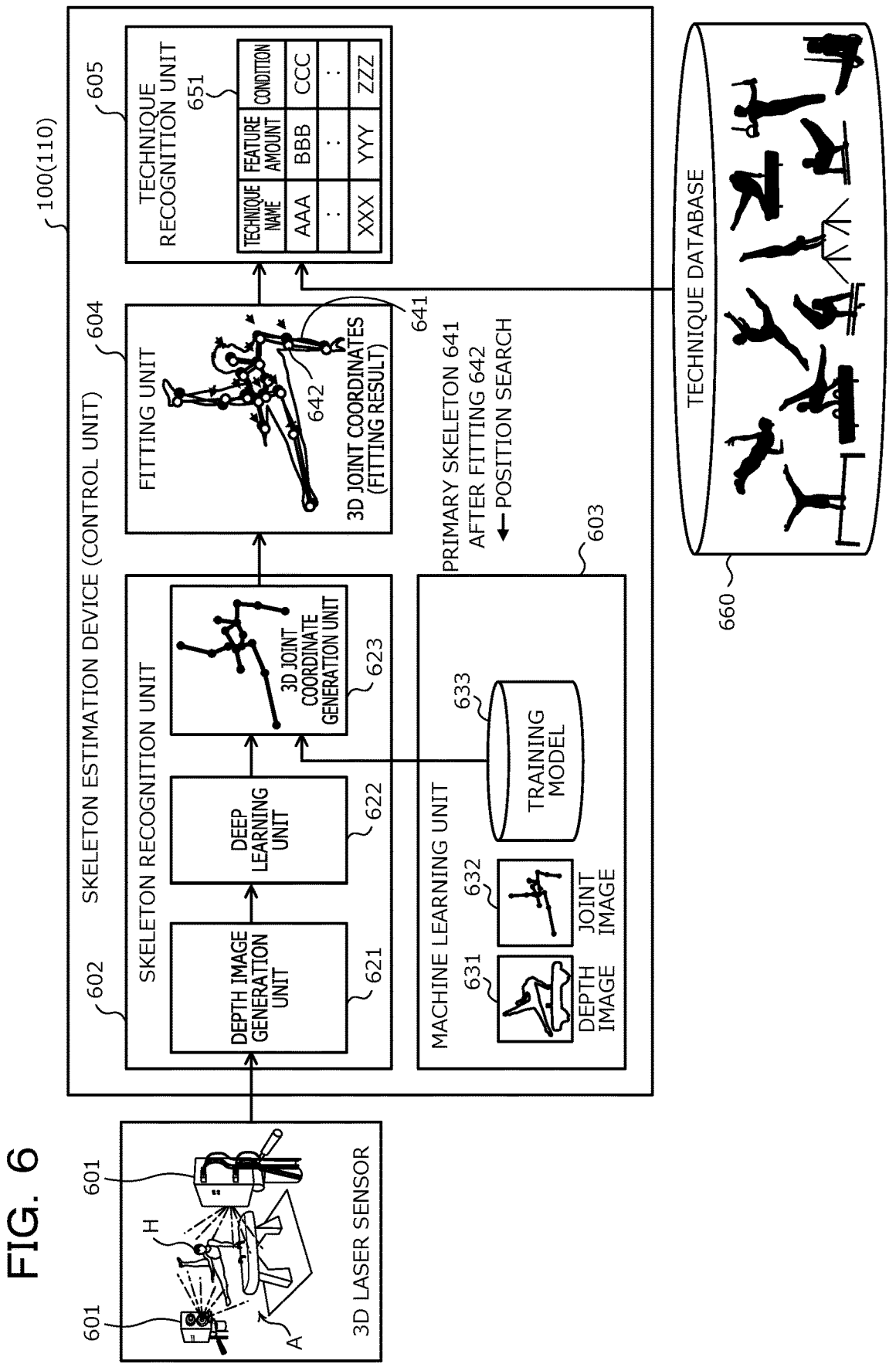
FIG. 6 is a diagram illustrating a configuration example of a gymnastics scoring support system including the skeleton estimation device according to the embodiment.

FIG. 6 is a diagram illustrating a configuration example of a gymnastics scoring support system including the skeleton estimation device according to the embodiment. The control unit 110 of the skeleton estimation device 100 provides the skeleton information (for example, posture) of the technique performed by the gymnast in the predetermined period to the scoring person who scores the technique performed by the gymnast in the gymnastics competition as information useful for scoring.

As illustrated in the figure, a 3D laser sensor 601 captures a gymnast H who performs a technique A of the gymnastics competition, and outputs, to the skeleton estimation device 100, a plurality of frames in the predetermined period (start is to end to of the technique) of the image (three-dimensional point cloud) including the distance information of each of the orthogonal X, Y, and Z axes. For example, a plurality of the 3D laser sensors 601 is arranged and each captures the gymnast H to output a multi-view image to the skeleton estimation device 100.

The skeleton estimation device 100 includes a skeleton recognition unit 602, a machine learning unit 603, a fitting unit 604, and a technique recognition unit 605. The skeleton estimation device 100 can access a technique database (DB) 660.

The machine learning unit 603 retains the three-dimensional skeleton information as a training model 633 based on a depth image 631 and joint coordinates 632, and outputs the three-dimensional skeleton information to the skeleton recognition unit 602.

The skeleton recognition unit 602 performs recognition processing for the skeleton of the gymnast H during the technique period of the gymnast H in each of units of frames, and outputs three-dimensional joint coordinates of the gymnast H in units of frames. The skeleton recognition unit 602 includes a depth image generation unit 621, a deep learning unit 622, and a 3D joint coordinate generation unit 623.

The depth image generation unit 621 generates a multi-view depth image for the gymnast H based on the information of the three-dimensional point cloud output from the plurality of 3D laser sensors 601. The deep learning unit 622 accesses the training model 633 of the machine learning unit 603, trains the multi-view depth image generated by the depth image generation unit 621, and obtains the three-dimensional skeleton information. The 3D joint coordinate generation unit 623 generates information of the three-dimensional joint coordinates of each frame of the gymnast H.

The fitting unit 604 performs processing of fitting the three-dimensional joint coordinates output from the skeleton recognition unit 602 (3D joint coordinate generation unit 623) to the depth image of the gymnast H for each frame. At this time, the fitting unit 604 recognizes the three-dimensional joint coordinates output from the 3D joint coordinate generation unit 623 as a primary skeleton 641.

The fitting unit 604 searches for a position of each joint position of the primary skeleton 641 in a direction of the arrow in the figure, fits the joint position to the depth image (trunk) of the gymnast H, and obtains fitted 3D joint coordinates 642. The fitted 3D joint coordinates 642 are more accurate skeleton information corresponding to a body shape of the gymnast H based on the primary skeleton, and are used as the above-described estimated skeleton information (posture).

The technique recognition unit 605 accesses the technique database 660 of various techniques of the gymnastics competition, and determines the motion (the technique executed by the gymnast H) that matches the technique in the technique database 660. The technique recognition unit 605 retains a technique recognition table 651 in which the feature amount (motion feature amount) and a condition for each technique name are set in advance.

The detection of the defective skeleton for the estimated skeleton information described in the above-described embodiment is performed by the technique recognition unit 605. At the time of detecting the defective skeleton, the skeleton estimation device 100 performs the fitting processing by the fitting unit 604 again for the information of the frames of the defective skeleton, for example, the above-described CG data K3 to K6 parts.

Information of the skeleton information of the gymnast, the angle of each joint, and the executed technique information retained by the technique recognition unit 605 is output to the scoring person as the skeleton (for example, posture) information.

(Configuration Example of Defective Skeleton Detection by Feature Amount)

Figure 7:
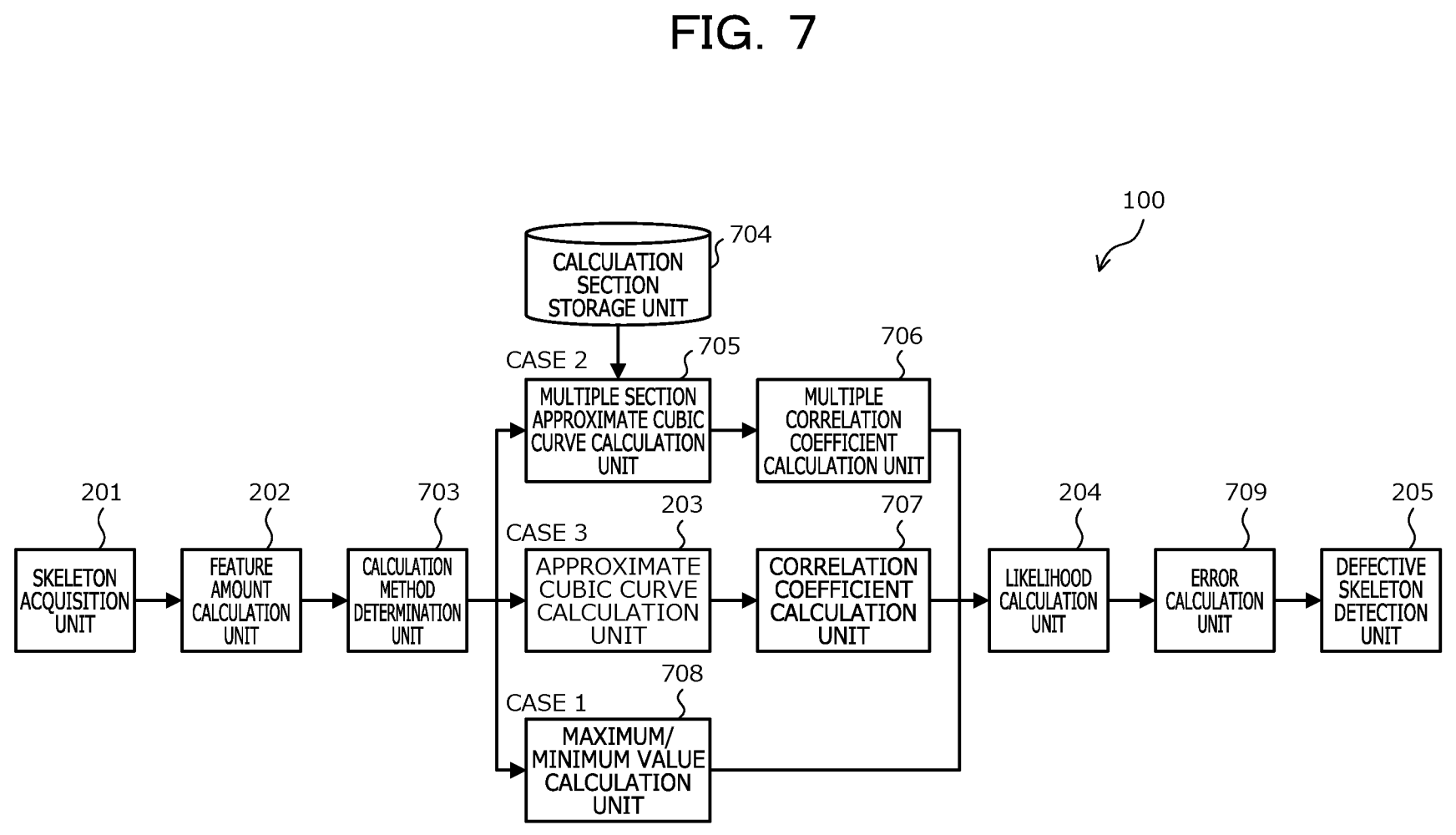

FIG. 7 is a block diagram illustrating a functional example of defective skeleton detection by feature amount. In FIG. 7, an example of detecting the defective skeleton by magnitude (twist amount) of the feature amount will be described. The function of detecting the defective skeleton illustrated in FIG. 7 is provided in the technique recognition unit 605 illustrated in FIG. 6.

In FIG. 7, configurations similar to those in FIG. 2 are denoted with the same reference signs. The skeleton estimation device 100 illustrated in FIG. 7 includes a skeleton acquisition unit 201, a feature amount calculation unit 202, an approximate cubic curve calculation unit 203, a likelihood calculation unit 204, and a defective skeleton detection unit 205 similar to FIG. 2. Furthermore, a calculation method determination unit 703, a calculation section storage unit 704, a multiple section approximate cubic curve calculation unit 705, a multiple correlation coefficient calculation unit 706, a correlation coefficient calculation unit 707, a maximum/minimum value calculation unit 708, and an error calculation unit 709 are included.

Here, the calculation method determination unit 703 determines a method of calculating the likelihood different by magnitude of the motion feature amount of the entire technique. In the following example, the method is divided into three cases of Case 1 to Case 3 by magnitude of the motion feature amount.

Case 1: For example, in the case where the motion feature amount is less than a preset range, the likelihood is calculated from the maximum value and the minimum value of the feature amount of each frame. In Case 1, the maximum/minimum value calculation unit 708 functions.

Case 2: In the case where the motion feature amount is within the preset range, an approximate line by a multidimensional function is calculated for each of a plurality of preset divided sections. Then, the likelihood is calculated from the maximum correlation coefficient among a plurality of correlation coefficients between the calculated approximate lines and the motion feature amount. In Case 2, the calculation section storage unit 704, the multiple section approximate cubic curve calculation unit 705, and the multiple correlation coefficient calculation unit 706 function.

Case 3: In the case where the motion feature amount exceeds the preset range, an approximate line by a multidimensional function is calculated from the feature amount from the start ts to the end te of the technique. In Case 3, the approximate cubic curve calculation unit 203 and the correlation coefficient calculation unit 707 function. Case 3 corresponds to the functional configuration of FIG. 2.

The skeleton acquisition unit 201 acquires the three-dimensional skeleton information of the gymnast from the 3D laser sensor or the like. The feature amount calculation unit 202 calculates the feature amount of each frame from the start ts to the end te of the technique.

The calculation method determination unit 703 classifies Cases 1 to 3 according to the magnitude of the feature amount calculated by the feature amount calculation unit 202, and causes the functional unit corresponding to each of Cases 1 to 3 to function.

In the case where the magnitude of the feature amount is less than the preset range, the calculation method determination unit 703 determines Case 1, and causes the corresponding maximum/minimum value calculation unit 708 to function. Furthermore, in the case where the magnitude of the feature amount falls within the preset range, the calculation method determination unit 703 determines the case to be Case 2, and causes the corresponding multiple section approximate cubic curve calculation unit 705 and multiple correlation coefficient calculation unit 706 to function. Furthermore, in the case where the magnitude of the feature amount exceeds the preset range, the calculation method determination unit 703 determines the case to be Case 3, and causes the corresponding approximate cubic curve calculation unit 203 and the correlation coefficient calculation unit 707 to function.

Case 1 corresponds to the case where the feature amount is less than the range, for example, the case of the technique without a twist amount in the vault. In this case, the maximum/minimum value calculation unit 708 calculates the maximum value and the minimum value of the feature amount between the start ts and the end te of the technique.

Case 2 corresponds to the case where the feature amount is within the range, for example, the case of the twist technique with a ½ twist amount in the vault. In this case, the multiple section approximate cubic curve calculation unit 705 calculates an approximate cubic curve in each of the divided sections stored in the calculation section storage unit 704, that is, the divided sections obtained by dividing the predetermined period from the start ts to the end te of the technique into the plurality of sections. Furthermore, the multiple correlation coefficient calculation unit 706 calculates the correlation coefficient between the cumulative twist angle and the approximate cubic curve for each of the divided sections.

Case 3 corresponds to the case where the feature amount exceeds the range, for example, the case of the twist technique in which the twist amount exceeds a single twist in the vault. In this case, the approximate cubic curve calculation unit 203 calculates the approximate line by the multidimensional function from the feature amount from the start ts to the end te of the technique. Furthermore, the correlation coefficient calculation unit 707 calculates the correlation coefficient between the cumulative twist angle and the approximate cubic curve.

The likelihood calculation unit 204 calculates the likelihood from the correlation coefficient between the calculated approximate line and the motion feature amount based on the output of each of Case 1 to Case 3 described above. The error calculation unit 709 calculates a difference (error) between the likelihood calculated by the likelihood calculation unit 204 and a preset threshold. The defective skeleton detection unit 205 calculates the frame in which the difference between the approximate line and the motion feature amount is the maximum in the case where the error likelihood is smaller than the preset threshold. Thereby, it becomes possible to detect the frame with the maximum error of the portion of the defective skeleton in the estimated skeleton information. Furthermore, it becomes possible to perform the skeleton estimation again for the frame with the maximum error.

(Processing Example of Case 1)

Figure 8:
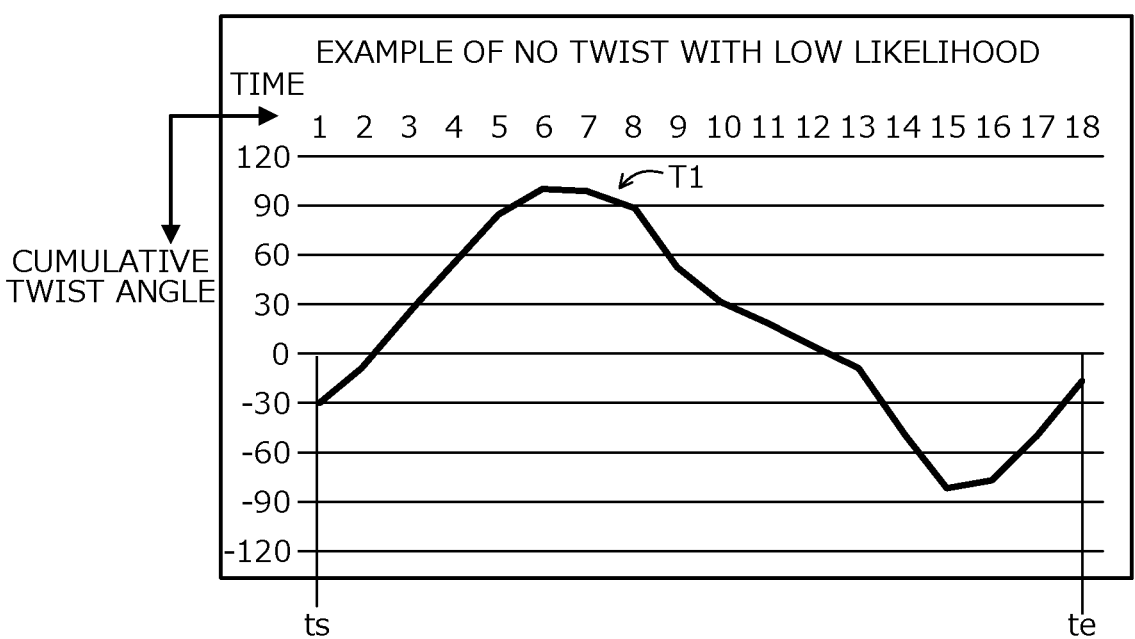
FIG. 8 is an explanatory graph of Case 1 in which the feature amount is less than a range.

FIG. 8 is an explanatory graph of Case 1 in which the feature amount is less than the range. In FIG. 8, the horizontal axis represents a time, and the vertical axis represents the cumulative twist angle. FIG. 8 illustrates the cumulative twist angle of the technique without a twist, for example, the second flight phase of the vault, for example. As technique definition of gymnastics, when the final cumulative twist angle is 90° or more, it is a technique with ½ twists, and when the final cumulative twist angle is a full twist or more, it is a technique with a twist. Therefore, in the technique without a twist, the final cumulative twist angle is less than 90°. The maximum/minimum value calculation unit 708 calculates the maximum/minimum angles of the twist in the predetermined period from the start is to the end to of the technique.

Here, it is assumed that there is a period (T1) in which the angle has become 90° or more once in the middle of the section in which the technique has been executed as illustrated in FIG. 8, for example, even in the case where the final cumulative twist angle is less than 90° and it is determined as the technique without a twist. In this case, in the case where the cumulative twist angle finally becomes less than 90° even though the cumulative twist angle has become 90° or more once, it means that a reverse turn has been performed in the air. This is an impossible move as an action of the human body. In this case, the likelihood calculation unit 204 outputs the likelihood low based on the cumulative amount of the feature amount in the predetermined period, so that the defective skeleton detection unit 205 can detect the defective skeleton.

(Processing Example of Case 3)

Figure 9A:
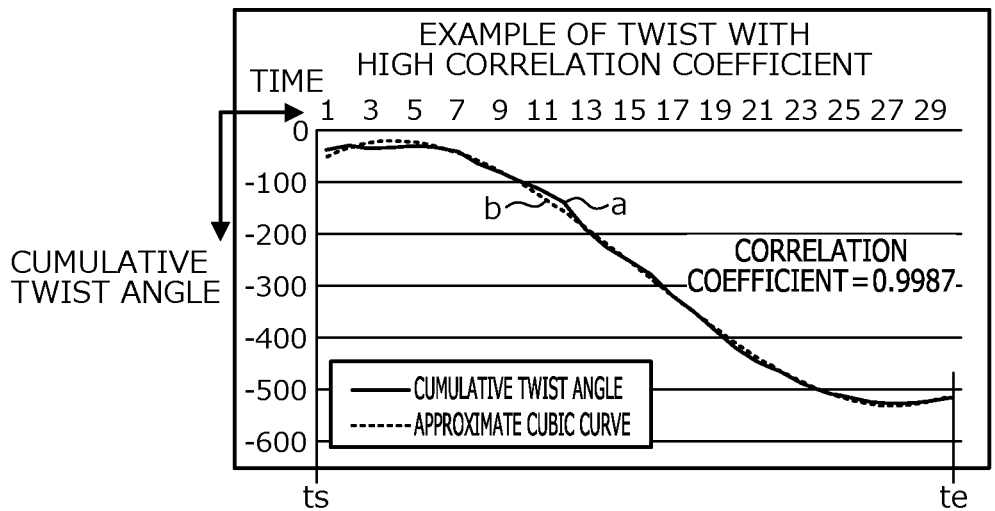
FIG. 9 (i.e., FIGS. 9A and 9B) is explanatory graphs of Case 3 in which the feature amount exceeds the range (part 1)
Figure 9B:
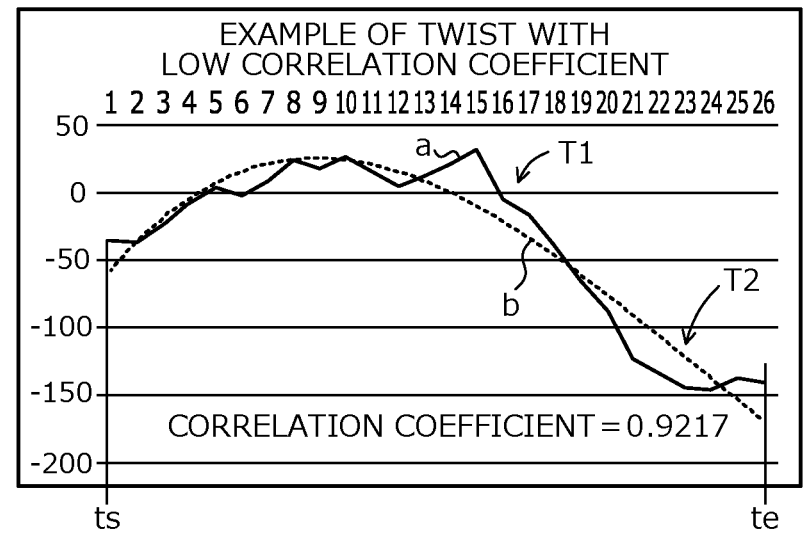
Figure 10:
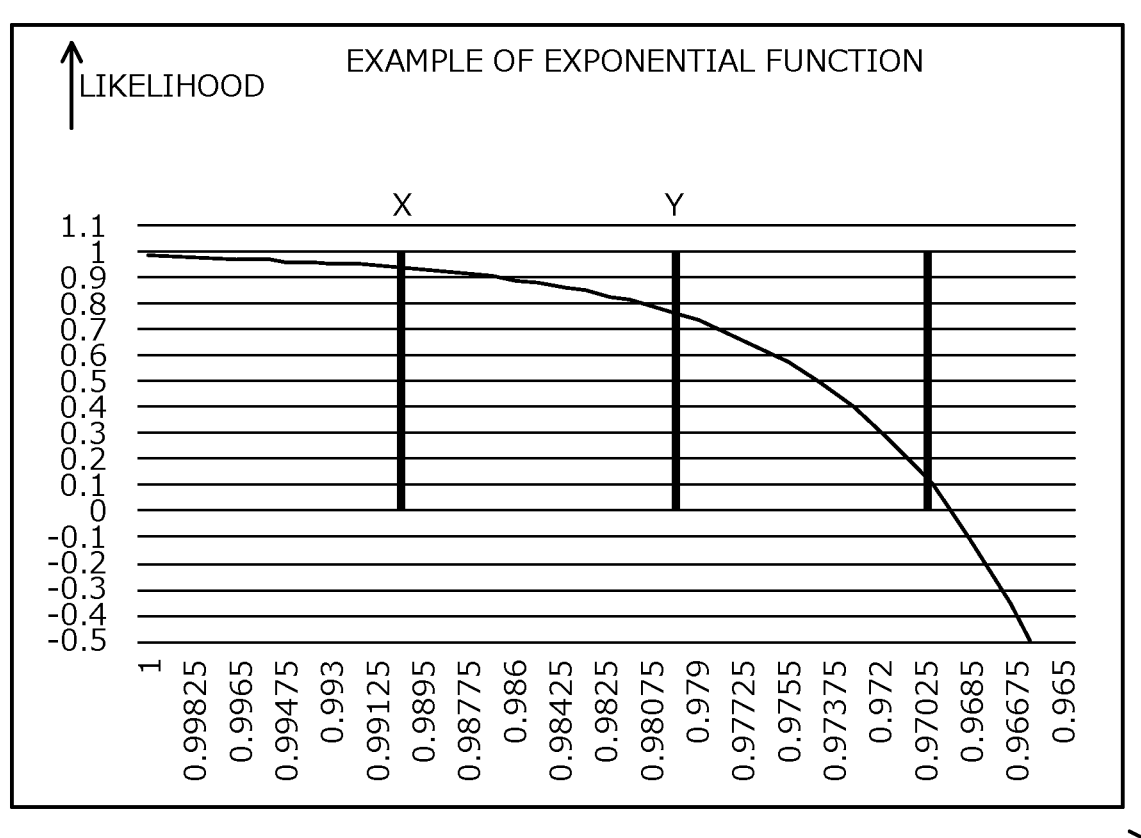
FIG. 10 is an explanatory graph of Case 3 in which the feature amount exceeds the range (part 2)

FIG. 9 (i.e., FIGS. 9A and 9B) and FIG. 10 are explanatory graphs of Case 3 in which the feature amount exceeds the range. The case where the technique is the single twist or more, for example, the case of the cumulative twist angle of the second flight phase of vault, is illustrated. FIGS. 9A and 9B are graphs illustrating examples of the correlation coefficients between the approximate line and the motion feature amount in Case 3. The horizontal axis represents the time, and the vertical axis represents the cumulative twist angle. The approximate cubic curve calculation unit 203 calculates the approximate cubic curve b (the dotted line in the figure) from the cumulative twist angle a (the solid line in the figure) in the predetermined period, that is, from the start is to the end to of the technique. The correlation coefficient calculation unit 707 calculates the correlation coefficient between the cumulative twist angle a and the approximate cubic curve b.

The likelihood calculation unit 204 calculates the likelihood from the correlation coefficient using an exponential function of a preset parameter. FIG. 10 illustrates an example of the exponential function for calculating the likelihood from the correlation coefficient. In FIG. 10, the horizontal axis represents the correlation coefficient, and the vertical axis represents the likelihood. As illustrated in FIG. 10, an exponential function is used that performs conversion such that the likelihood becomes a high numerical value until the correlation coefficient reaches a preset numerical value X, and the likelihood rapidly decreases when the correlation coefficient becomes equal to or less than a preset numerical value Y.

Then, the defective skeleton detection unit 205 detects the presence or absence of the defective skeleton based on the degree of similarity (correlation coefficient) between the cumulative twist angle and the approximate cubic curve. In the case where the skeleton is correct, the cumulative twist angle a and the approximate cubic curve b are similar as illustrated in FIG. 9A, and the correlation coefficient is high. Thereby, the control unit 110 determines that the skeleton information estimated in the predetermined period (from the start ts to the end te of the technique) is correct.

On the other hand, in the case where the skeleton is incorrect, there is a difference between the cumulative twist angle a and the approximate cubic curve b as illustrated in FIG. 9B, and the correlation coefficient is low. Thereby, the defective skeleton detection unit 205 determines that there is an incorrect portion in the skeleton information estimated in the predetermined period (from the start ts to the end te of the technique). In this case, for example, the defective skeleton detection unit 205 can perform the skeleton determination again for the periods T1 and T2 in which there is a difference between the cumulative twist angle a and the approximate cubic curve b and the correlation coefficient is low.

(Processing Example of Case 2)

Figure 11A:
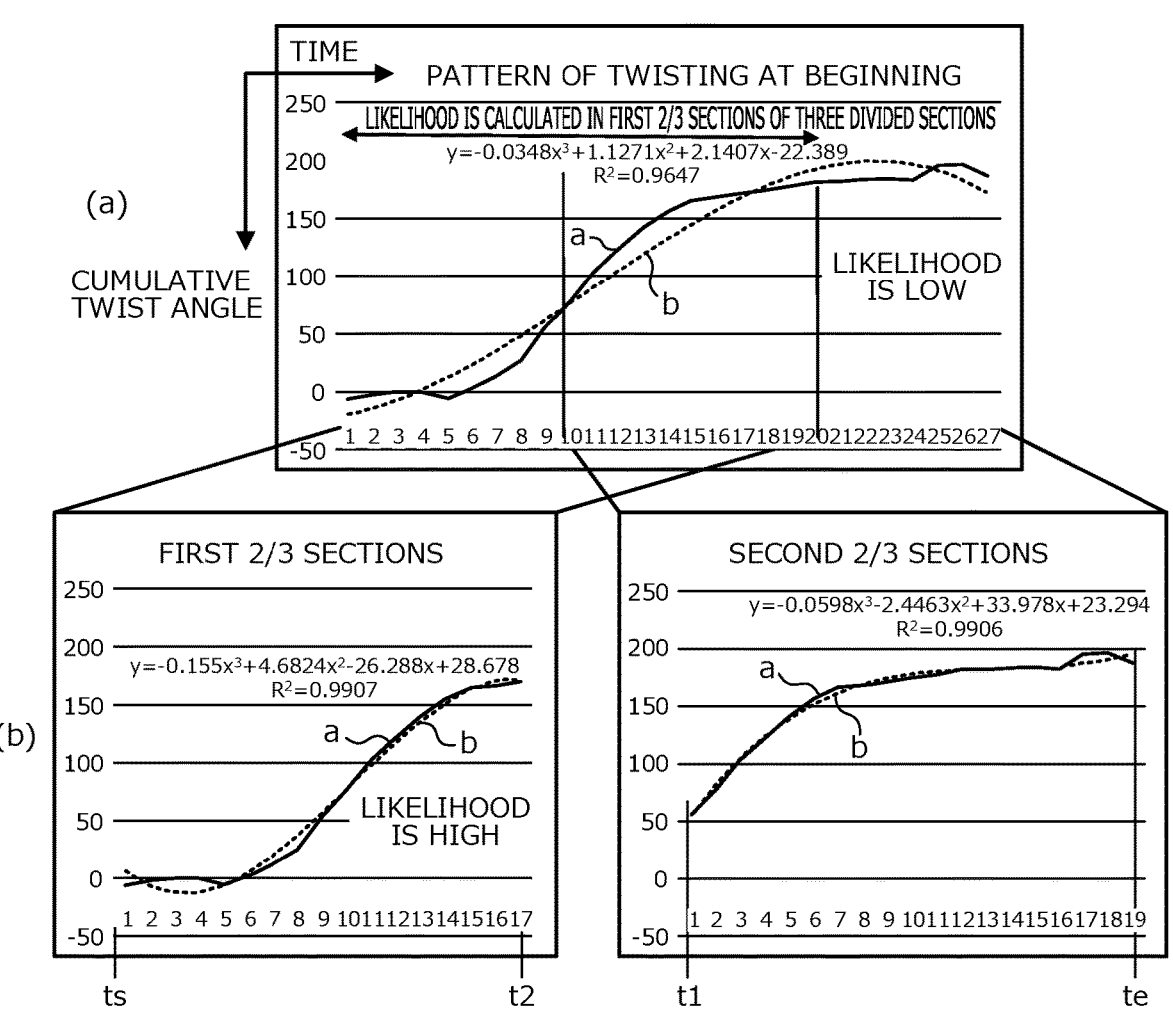
FIG. 11A is explanatory graphs of Case 2 in which the feature amount falls within the range (part 1)
Figure 11B:
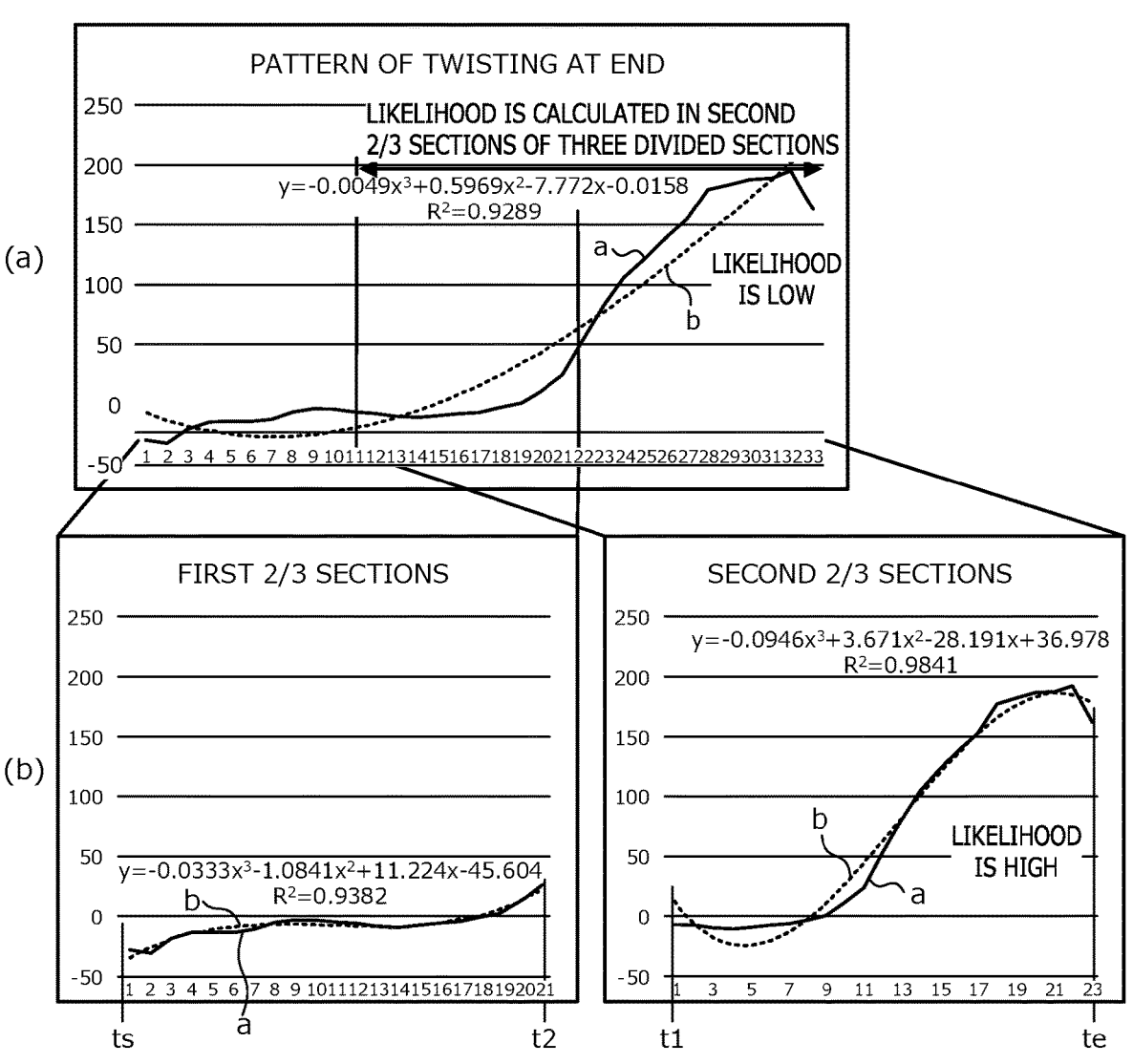
FIG. 11B is explanatory graphs of Case 2 in which the feature amount falls within the range (part 2)

FIGS. 11A and 11B are explanatory graphs of Case 2 in which the feature amount falls within the range. The case where the technique is the ½ twists, for example, the case of the cumulative twist angle of the second flight phase of vault, is illustrated. In this Case 2, the detection of the feature amount is basically by the same method as in Case 3 above with the single twist or more. Note that, since the number of twists is small in the ½ twist technique, existence of patterns in which the twist is not performed in the executed entire technique and the twist is executed around the beginning of the section in which the technique is executed and in which the twist is executed around the end of the section in which the technique is executed are considered.

FIG. 11A is explanatory graphs when the twist technique is executed only around the beginning of the entire technique, and FIG. 11B is explanatory graphs when the twist technique is executed only around the end of the entire technique. In these graphs, the horizontal axis represents the time, and the vertical axis represents the cumulative twist angle.

In the patterns illustrated in FIGS. 11A and 11B, when the correlation coefficient between the cumulative twist angle a and the approximate cubic curve b is calculated for the executed entire technique, the likelihood becomes low as an example (a) illustrated in FIG. 11A and an example (a) illustrated in FIG. 11B.

Therefore, in the case where the technique is the ½ twists, not the entire section in which the technique has been executed but the period from the start ts to the end te in which the technique has been executed is divided into a plurality of divided sections, and the divided sections are caused to temporally and partially overlap each other. For example, as illustrated in FIG. 11A, the period is divided into three divided sections, the first ⅔ divided sections and the second ⅔ divided sections are obtained, and the approximate cubic curve is calculated for each divided section.

For example, in the case where the twist technique is executed only around the beginning of the entire technique, the approximate cubic curve is calculated in each of the first ⅔ divided sections from the start ts to time t2 of the technique and the second ⅔ divided sections from time t1 to the end te, as an example (b) illustrated in FIG. 11A. Thereby, the likelihood in the first ⅔ divided sections becomes high, and it becomes possible to accurately detect the defective skeleton for the skeleton information in which the twist technique executed in the first half is estimated.

Similarly, even in the case where the twist technique is executed only around the end of the entire technique, the approximate cubic curve is calculated in each of the first ⅔ divided sections and the second ⅔ divided sections, as an example (b) illustrated in FIG. 11B. Thereby, the likelihood in the second ⅔ divided sections becomes high, and it becomes possible to accurately detect the defective skeleton for the skeleton information in which the twist executed in the second half is estimated.

Figure 12:
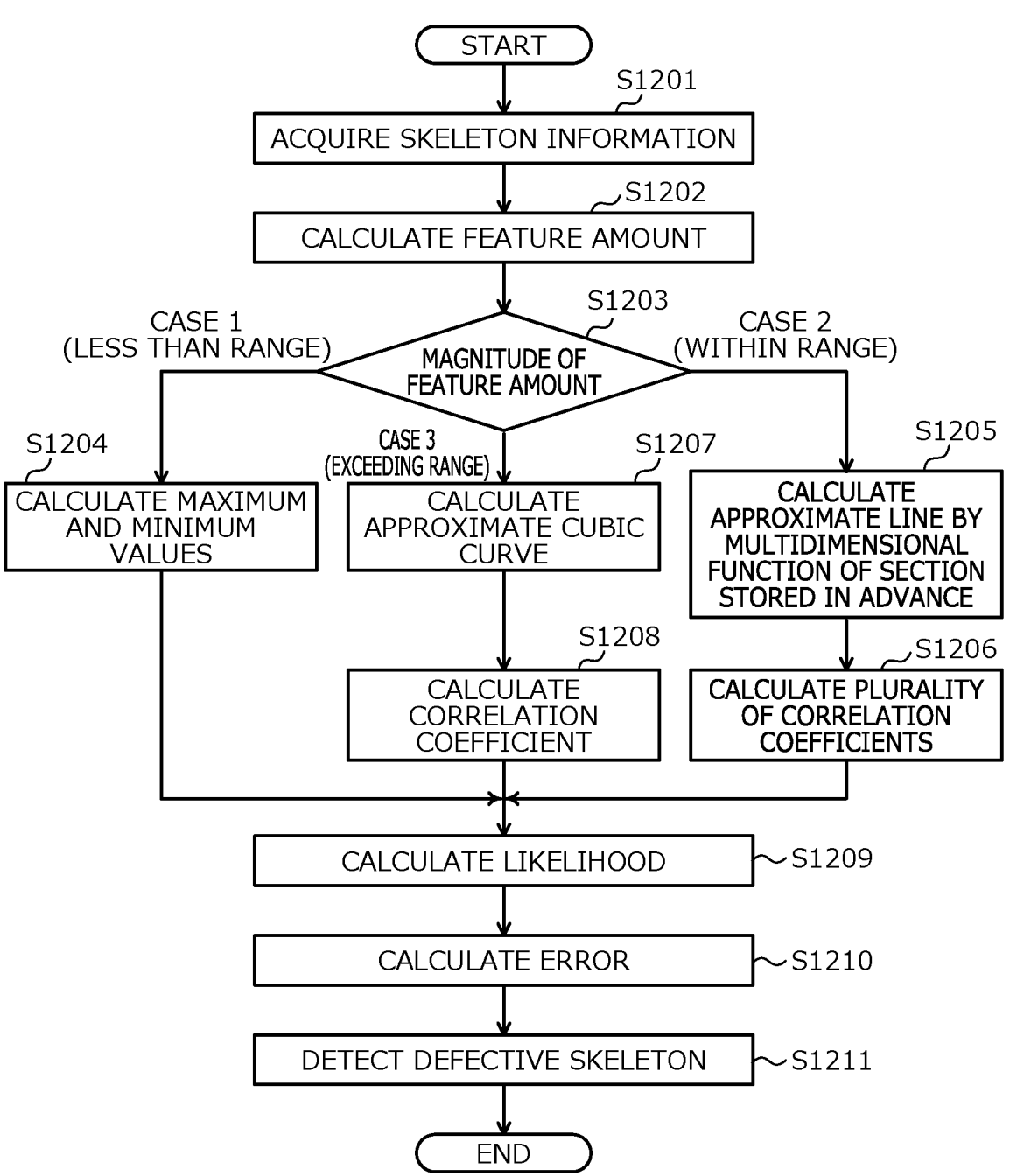
FIG. 12 is a flowchart illustrating a processing example of defective skeleton detection by feature amount.

FIG. 12 is a flowchart illustrating a processing example of defective skeleton detection by feature amount. The functions of FIG. 7 performed by the control unit 110 of the skeleton estimation device 100 and a processing example corresponding to each description of FIGS. 8 to 11B will be described.

First, the control unit 110 acquires the three-dimensional skeleton information of the gymnast from the 3D laser sensor or the like (step S1201). Next, the control unit 110 calculates the feature amount of each frame from the start ts to the end te of the technique (step S1202).

Next, the control unit 110 determines the magnitude of the feature amount and proceeds to processing by magnitude (step S1203). In the case where the feature amount is less than the preset range, the case is determined as Case 1 (step S1203: Case 1), and the processing proceeds to step S1204. Furthermore, in the case where the feature amount falls within the preset range, the case is determined as Case 2 (step S1203: Case 2), and the processing proceeds to step S1205. Furthermore, in the case where the feature amount exceeds the preset range, the case is determined as Case 3 (step S1203: Case 3), and the processing proceeds to step S1207.

In Case 1, the control unit 110 calculates the maximum value and the minimum value of the feature amount during the predetermined period (the start ts to the end te of the technique) (step S1204), and proceeds to the processing of step S1209.

In Case 2, the control unit 110 calculates the approximate line by a multidimensional function for each of a plurality of sections stored in advance for the period up to the predetermined period (the start ts to the end te of the technique) (step S1205). Thereafter, the control unit 110 obtains the correlation coefficient between the approximate line calculated for each of the plurality of sections and the motion feature amount (step S1206), and proceeds to the processing of step S1209.

In Case 3, the control unit 110 calculates the approximate cubic curve from the feature amount during the predetermined period (the start ts to the end te of the technique) (step S1207). Thereafter, the control unit 110 calculates the correlation coefficient between the calculated cubic approximate curve and the feature amount (step S1208) and proceeds to the processing of step S1209.

Next, the control unit 110 calculates the likelihood (step S1209). Here, for processing data of Cases 2 and 3, the likelihood is calculated from the correlation coefficient between the calculated approximate line and the motion feature amount. Meanwhile, for the processing data of Case 1, the control unit 110 outputs the likelihood low with respect to the impossible move based on the feature amount (the maximum value and the minimum value of the twist angle, the description of FIG. 8) without using the correlation.

Thereafter, in the case where the likelihood is smaller than the preset threshold, the control unit 110 calculates the error between the approximate line and the motion feature amount (step S1210). Then, the control unit 110 detects the frame of the portion of the defective skeleton in the estimated skeleton information by calculating the frame with the error equal to or larger than a predetermined value (step S1211).

Thereby, the control unit 110 becomes able to detect the presence or absence of the defective skeleton for the skeleton estimated in the predetermined period (the start is to the end to of the technique). For example, CG frames K3 to K6 in FIG. 5 can be detected as the defective skeleton NG. Thereby, the control unit 110 can perform the skeleton determination again for the portion of the detected defective skeleton NG.

(Example of Detecting Defective Skeleton for Other Techniques)

In the above-described embodiment, the example of detecting the defective skeleton in the case where the motion feature amount is the "motion twist amount" has been described by taking the vault competition of gymnastics as an example. In the embodiment, it is possible to detect the defective skeleton not only for the gymnastics competition but also for a skeleton estimated based on a movement change in a joint of a human body.

Figure 13A:
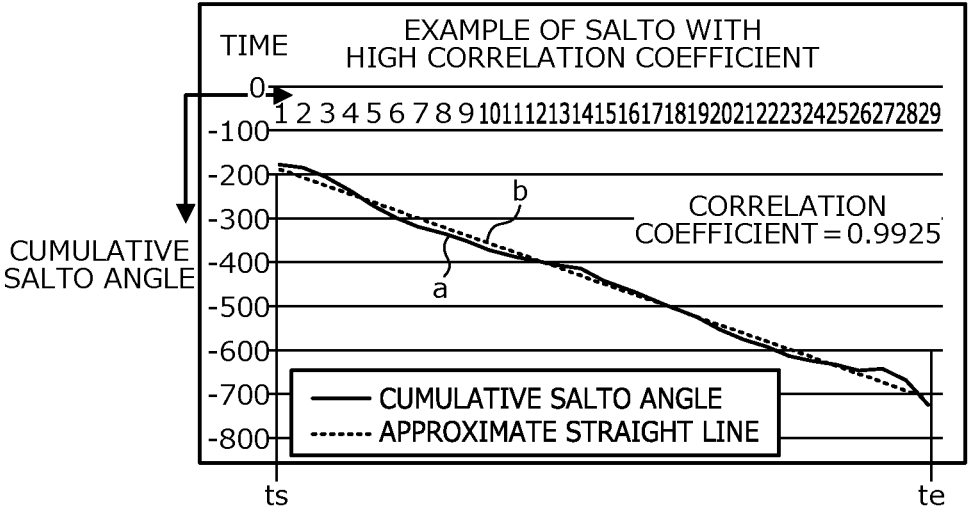
FIG. 13 (i.e., FIGS. 13A and 13B) is explanatory graphs of detection of a defective skeleton for another feature amount.
Figure 13B:
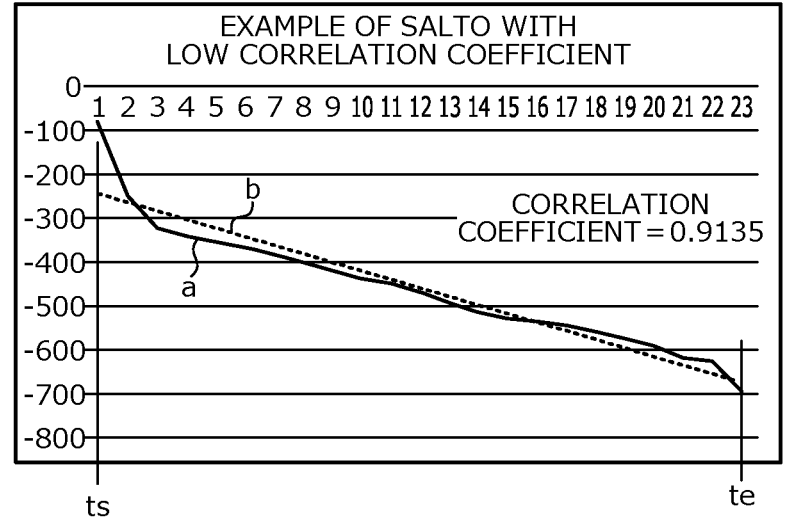

FIG. 13 (i.e., FIGS. 13A and 13B) is explanatory graphs of detection of the defective skeleton for another feature amount. FIG. 13 illustrates a correlation state between the approximate line and the motion feature amount in a case where the cumulative salto angle motion feature amount of the second flight phase of vault is a "salto (vertical turn)".

In the case where the motion feature amount is a "salto", it is possible to obtain a correlation with the cumulative salto angle using a primary straight line. In this case, the control unit 110 calculates the approximate straight line (primary straight line) from the cumulative salto angle. Thereafter, the control unit 110 calculates the correlation coefficient between the cumulative salto angle and the approximate straight line. Thereafter, the control unit 110 calculates the likelihood from the correlation coefficient using an exponential function of a preset parameter. Here, as an example of the exponential function for calculating the likelihood from the correlation coefficient, an exponential coefficient similar to that in the case of the twist illustrated in FIG. 10 can be used.

Then, the control unit 110 becomes able to detect the defective skeleton for the skeleton estimated based on the degree of similarity (correlation) between the cumulative salto angle and the approximate straight line. In the example illustrated in FIG. 13A, since the cumulative salto angle a and the approximate straight line b are similar and the correlation coefficient is high, it can be determined that the estimated skeleton is correct. Meanwhile, as illustrated in FIG. 13B, in the case where there is a difference between the cumulative salto angle a and the approximate straight line b, the correlation coefficient becomes low, and it becomes possible to detect the defective skeleton in which the estimated skeleton is incorrect.

As described above, even for the different feature amounts of various techniques or the like, it is possible to detect the defective skeleton based on the correlation between the cumulative angle in the predetermined period (from the start ts to the end to of the technique) described above and the multidimensional function suitable for the technique.

According to the above-described embodiment, the skeleton estimation device acquires the estimation information in which a change in the skeleton in the predetermined period is estimated in units of frames, calculates the feature amount of the change in the skeleton in the predetermined period, calculates the approximate line based on the calculated feature amount, calculates the correlation state between the calculated feature amount and the calculated approximate line, and detects, as the defective skeleton, a frame portion in which estimation is abnormal in the estimation information in the predetermined period based on the correlation state. The feature amount corresponds to the change in the skeleton, and is, for example, a twist or a turn of a body or the like. Thereby, it becomes possible to detect a portion different from an actual move in the estimated skeleton as the defective skeleton. Furthermore, the defective skeleton is determined based on the change in the skeleton over the entire predetermined period. Thereby, it becomes possible to detect the defective skeleton in a case where the change is small only between adjacent frames so that the detection is not possible or a case where the change occurs in the entire predetermined period, as compared with detection based on a sudden change between partial adjacent frames as in an existing case.

Furthermore, the skeleton estimation device becomes able to detect the defective skeleton in the estimation information of the skeleton by feature amount, for example, by different twist amount, by using a different method of detecting the defective skeleton according to the magnitude of the feature amount. The skeleton estimation device calculates the approximate curve by a multidimensional function from the feature amount in the predetermined period in a case where the feature amount exceeds a preset range, calculates the likelihood from the correlation coefficient between the calculated feature amount and the calculated approximate curve, and detects, as the defective skeleton, the frame with a maximum difference between the feature amount and the approximate curve in a case where the likelihood is smaller than a preset threshold. Thereby, it becomes possible to accurately detect the skeleton defect in the case where the change in the skeleton is large.

Furthermore, the skeleton estimation device calculates each of the approximate curves by a multidimensional function from the feature amount for each divided section obtained by dividing the predetermined period into a plurality of divided sections in a case where the feature amount falls within a preset range, calculates the likelihood from the correlation coefficient between the feature amount calculated in each of the divided sections and the calculated approximate curve, and detects, as the defective skeleton, the frame with a maximum difference between the feature amount and the approximate curve in a case where the likelihood is smaller than a preset threshold. Here, the division may be performed such that a plurality of divided sections partially and temporally overlaps each other. Thereby, it becomes possible to accurately detect the defective skeleton for each divided section. For example, even in a case where the twist is performed only in the first half or the second half of the predetermined period, it becomes possible to accurately detect the defective skeleton for the twist estimation information by using the divided sections.

Furthermore, the skeleton estimation device calculates the maximum value and the minimum value of the feature amount in the predetermined period in a case where the feature amount is less than the preset range, calculates the likelihood based on the cumulative amount of the feature amounts including the calculated maximum value and the calculated minimum value, and detects the defective skeleton based on the likelihood. Thereby, it becomes possible to accurately detect the defective skeleton for the estimation information even in the case where the change in the feature amount is small. For example, it becomes possible to accurately detect the defective skeleton for the skeleton estimation information in the case where a twist is not performed in the predetermined period.

Furthermore, the skeleton estimation device can estimate the skeleton again for the frame portion of the detected defective skeleton. Thereby, it becomes possible to present accurate skeleton information to the outside over the entire predetermined period.

Furthermore, the above-described skeleton estimation device can be applied to a gymnastics scoring support system of a gymnastics competition in which a gymnast executes a technique. The gymnastics scoring support system includes the 3D laser sensor that captures an image of the gymnast, and the skeleton estimation device that includes the skeleton recognition unit that acquires an image of the three-dimensional point cloud including the distance information in units of frames, generates the depth image from the image of the three-dimensional point cloud, and recognizes the three-dimensional skeleton of the gymnast based on the training model that has been trained from the depth image in advance, the fitting unit that outputs the three-dimensional skeleton adapted to the skeleton of the gymnast as the estimation information based on the three-dimensional point cloud and the three-dimensional skeleton, and the control unit. The control unit has the feature amount by technique set in advance, and detects the defective skeleton in the estimation information output from the fitting unit corresponding to execution of a predetermined technique by the gymnast. Thereby, the control unit estimates the change in the skeleton of the gymnast over the predetermined period and presents the skeleton information corresponding to the technique executed in the predetermined period by the gymnast to the scoring person. The scoring person becomes able to perform more accurate scoring not only visually but also based on the technique of gymnastics executed by the gymnast using the skeleton information presented by the skeleton estimation device, for example, the angle of each joint or the like.

Furthermore, the skeleton estimation device presents the estimation information to the scoring person of the gymnastics competition, and presents the estimation information after the skeleton is estimated again for the frame portion of the defective skeleton at the time of detecting the defective skeleton. Thereby, the skeleton estimation device becomes able to always present the correctly estimated skeleton information to the scoring person and to improve the reliability of the estimated skeleton information presented by the skeleton estimation device.

As described above, according to the embodiment, it is possible to correctly detect the skeleton that changes over the entire predetermined period, and it becomes possible to detect the defective skeleton and estimate the skeleton again even in the case where there is the defective skeleton in part of the estimated skeleton information. The estimation of the skeleton of the embodiment is not limited to the gymnastics competition, and can be applied to skeleton estimation in various fields such as examination and monitoring of a patient in medical care.

Note that the skeleton estimation method described in the embodiment of the present invention may be implemented by causing a processor such as a server to execute a program prepared in advance. The present skeleton estimation method is recorded on a computer-readable recording medium such as a hard disk, a flexible disk, a compact disc-read only memory (CD-ROM), a digital versatile disk (DVD), a flash memory, or the like, and is read from the recording medium and executed by a computer. Furthermore, the present skeleton estimation method may be distributed via a network such as the Internet.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A skeleton estimation device comprising:
memory; and
processor circuitry coupled to the memory, the processor circuitry being configured to perform processing including:
acquiring estimation information in which a change in a skeleton in a predetermined period is estimated in units of frames;
calculating a feature amount of the change in the skeleton in the predetermined period;
calculating an approximate line based on the calculated feature amount;
calculating a correlation state between the calculated feature amount and the calculated approximate line;
calculating a likelihood based on the feature amount in the predetermined period; and
detecting, as a defective skeleton, the frame portion in which estimation is abnormal in the estimation information in the predetermined period based on the correlation state, and detecting the defective skeleton based on the likelihood.

2. The skeleton estimation device according to claim 1, the processing further comprising:
calculating an approximate curve by a multidimensional function from the feature amount in the predetermined period in a case where the feature amount exceeds a preset range;
calculating the likelihood of the feature amount in the predetermined period from a correlation coefficient between the calculated feature amount and the calculated approximate curve; and
detecting, as the defective skeleton, the frame with a maximum difference between the feature amount and the approximate curve in a case where the likelihood is smaller than a preset threshold.

3. The skeleton estimation device according to claim 1, the processing further comprising:
calculating each of the approximate curves by a multidimensional function from the feature amount for each divided section obtained by dividing the predetermined period into a plurality of divided sections in a case where the feature amount falls within the preset range;
calculating the likelihood from a correlation coefficient between the feature amount calculated in each of the divided sections and the calculated approximate curve; and
detecting, as the defective skeleton, the frame with a maximum difference between the feature amount and the approximate curve in a case where the likelihood is smaller than the preset threshold.

4. The skeleton estimation device according to claim 3, the processing further comprising:
performing the division such that some of the plurality of divided sections temporarily overlaps each other.

5. The skeleton estimation device according to claim 1, the processing further comprising:
calculating a maximum value and a minimum value of the feature amount in the predetermined period in a case where the feature amount is less than the preset range;
calculating the likelihood based on a cumulative amount of the feature amounts that includes the calculated maximum value and the calculated minimum value; and
detecting the defective skeleton based on the likelihood.

6. The skeleton estimation device according to claim 1, the processing further comprising:
estimates a skeleton again for the detected frame portion of the defective skeleton.

7. The skeleton estimation device according to claim 1, wherein the feature amount is a motion feature amount that corresponds to a predetermined motion of a human body assumed in advance in the predetermined period.

8. A skeleton estimation method implemented by a computer, the skeleton estimation method comprising:
acquiring estimation information in which a change in a skeleton in a predetermined period is estimated in units of frames;
calculating a feature amount of the change in the skeleton in the predetermined period;
calculating an approximate line based on the calculated feature amount;
calculating a correlation state between the calculated feature amount and the calculated approximate line;
calculating a likelihood based on the feature amount in the predetermined period; and
detecting, as a defective skeleton, the frame portion in which estimation is abnormal in the estimation information in the predetermined period based on the correlation state, and detecting the defective skeleton based on the likelihood.

9. A gymnastics scoring support system of a gymnastics competition in which a gymnast executes a technique, the gymnastics scoring support system comprising first processor circuitry configured to perform processing comprising:

acquiring estimation information in which a change in a skeleton of the gymnast over a predetermined period is estimated in units of frames;

calculating a feature amount of the change in the skeleton in the predetermined period;

calculating an approximate line based on the calculated feature amount;

calculating a correlation state between the calculated feature amount and the calculated approximate line;

calculating a likelihood based on the feature amount in the predetermined period; and detecting, as a defective skeleton, the frame portion in which estimation is abnormal in the estimation information in the predetermined period based on the correlation state, and detecting the defective skeleton based on the likelihood.

10. The gymnastics scoring support system according to claim 9, the system further comprising:

a 3D laser sensor configured to capture the gymnast and output an image of a three-dimensional point cloud that includes distance information in units of frames; and a skeleton estimation device, wherein the skeleton estimation device includes second processor circuitry configured to perform processing including:

generating a depth image from the image of the three-dimensional point cloud and recognizes a three-dimensional skeleton of the gymnast based on a training model trained in advance from the depth image; and outputting a three-dimensional skeleton adapted to the skeleton of the gymnast as the estimation information based on the three-dimensional point cloud and the three-dimensional skeleton, and the first processor circuitry is further configured to:

obtain the feature amount set by the technique in advance; and detect the defective skeleton in the estimation information output by the fitting unit, corresponding to execution of a predetermined technique by the gymnast.

11. The gymnastics scoring support system according to claim 10, wherein the first processor circuitry is configured to:

present the estimation information to a scoring person of the gymnastics competition; and present the estimation information again after the skeleton is estimated for the frame portion of the defective skeleton at the time when the defective skeleton is detected.

12. The gymnastics scoring support system according to claim 11, wherein the feature amount is a motion feature amount different by technique executed by the gymnast.

13. The gymnastics scoring support system according to claim 12, wherein the technique includes a twist and a salto.

* * * * *